United States Patent
Roh et al.

(10) Patent No.: US 9,455,436 B2
(45) Date of Patent: Sep. 27, 2016

(54) BATTERY PACK OF IMPROVED SAFETY

(71) Applicant: LG CHEM, LTD., Seoul (KR)

(72) Inventors: Taehwan Roh, Daejeon (KR); Jin Kyu Lee, Daejeon (KR); Junseok Choi, Daejeon (KR); Min Chul Jang, Daejeon (KR); In Cur Shin, Daejeon (KR); Dalmo Kang, Daejeon (KR); Seongtae Kim, Incheon (KR); Taehyuck Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 389 days.

(21) Appl. No.: 14/154,828

(22) Filed: Jan. 14, 2014

(65) Prior Publication Data

US 2014/0127549 A1    May 8, 2014

Related U.S. Application Data

(63) Continuation of application No. PCT/KR2012/004646, filed on Jun. 13, 2012.

(30) Foreign Application Priority Data

Jul. 25, 2011 (KR) .................. 10-2011-0073500

(51) Int. Cl.
*H01M 2/34* (2006.01)
*H01M 2/20* (2006.01)
*H01M 2/30* (2006.01)
*H01M 2/02* (2006.01)
*H01M 2/10* (2006.01)

(52) U.S. Cl.
CPC .......... *H01M 2/345* (2013.01); *H01M 2/1077* (2013.01); *H01M 2/206* (2013.01); *H01M 2/30* (2013.01); *H01M 2/34* (2013.01); *H01M 2/0217* (2013.01); *H01M 2/1061* (2013.01)

(58) Field of Classification Search
CPC .... H01M 2/1061; H01M 2/34; H01M 2/345; H01M 2/0217
USPC ......................................... 429/150
See application file for complete search history.

(56) References Cited

U.S. PATENT DOCUMENTS

| | | | |
|---|---|---|---|
| 2011/0014512 A1* | 1/2011 | Amagai | H01M 2/0217 429/159 |
| 2011/0039147 A1 | 2/2011 | Cheon et al. | |
| 2011/0189515 A1 | 8/2011 | Yoon et al. | |

FOREIGN PATENT DOCUMENTS

| | | |
|---|---|---|
| JP | 10-214612 A | 8/1998 |
| JP | 2011-504285 A | 2/2011 |

(Continued)

OTHER PUBLICATIONS

International Search Report issued in PCT/KR2012/004646 mailed Nov. 22, 2012.

*Primary Examiner* — Basia Ridley
*Assistant Examiner* — James Erwin
(74) *Attorney, Agent, or Firm* — Birch, Stewart, Kolasch & Birch, LLP (57) ABSTRACT

Disclosed herein is a battery pack configured such that battery modules, each of which includes a plurality of battery cells or unit modules connected to each other in series, are connected to each other in series in a state in which the battery modules are in tight contact with each other or stacked adjacent to each other, the battery pack including a fuse connected in series in an electrical connection circuit between the battery modules and a circuit breaker mounted at an outside of at least one of the battery modules to perform electric conduction when the battery cells swell, the circuit breaker being electrically connected to the electrical connection circuit to break the fuse when electric conduction is performed due to swelling of the battery cells.

17 Claims, 6 Drawing Sheets

(56) References Cited

FOREIGN PATENT DOCUMENTS

| JP | 2011-90873 A | 5/2011 |
|---|---|---|
| KR | 10-2005-0107681 A | 11/2005 |
| KR | 10-2009-0052520 A | 5/2009 |
| KR | 10-2011-0017778 A | 2/2011 |

* cited by examiner

BATTERY PACK OF IMPROVED SAFETY

CROSS-REFERENCE TO RELATED APPLICATIONS

This application is a Continuation of PCT International Application No. PCT/KR2012/004646 filed on Jun. 13, 2012, which claims the benefit of Patent Application No. 10-2011-0073500 filed in the Republic of Korea on Jul. 25, 2011. The entire contents of all of the above applications are hereby expressly incorporated by reference into the present application.

TECHNICAL FIELD

The present invention relates to a battery pack with improved safety and, more particularly, to a battery pack configured such that battery modules, each of which includes a plurality of battery cells or unit modules connected to each other in series, are connected to each other in series in a state in which the battery modules are in tight contact with each other or stacked adjacent to each other, the battery pack including a fuse connected in series in an electrical connection circuit between the battery modules and a circuit breaker mounted at an outside of at least one of the battery modules to perform electric conduction when the battery cells swell, the circuit breaker being electrically connected to the electrical connection circuit to break the fuse when electric conduction is performed due to swelling of the battery cells.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), and a laptop computer.

A small-sized battery pack, in which a battery cell is mounted, is used for small-sized devices, such as a mobile phone and a digital camera. On the other hand, a middle or large-sized battery pack, in which a battery pack including two or more battery cells (hereinafter, also referred to as a "multi-cell") connected to each other in parallel and/or in series is mounted, is used for middle or large-sized devices, such as a laptop computer and an electric vehicle.

A lithium secondary battery exhibits excellent electrical properties as described above; however, the lithium secondary battery has low safety. For example, when abnormal operations, such as overcharge, overdischarge, exposure to high temperature, and an electrical short circuit, of the lithium secondary battery occur, decomposition of active materials and an electrolyte, which are components of the battery, is caused with the result that heat and gas are generated and the high-temperature and high-pressure conditions caused by generation of the heat and the gas accelerate the above-mentioned decomposition. Eventually, a fire or explosion may occur.

For this reason, the lithium secondary battery is provided with a safety system, such as a protection circuit to interrupt electric current when the battery is overcharged or overdischarged or when overcurrent flows in the battery, a positive temperature coefficient (PTC) element whose resistance greatly increases so as to interrupt electric current when the temperature of the battery increases, and a safety vent to interrupt electric current or to exhaust gas when pressure increases due to generation of the gas. In case of a small-sized cylindrical secondary battery, for example, the PTC element and the safety vent are usually disposed at the top of an electrode assembly (a generating element) having a cathode/separator/anode structure, which is mounted in a cylindrical container. In case of a small-sized prismatic or pouch-shaped secondary battery, on the other hand, the protection circuit module and the PTC element are usually mounted at the upper end of a prismatic container or a pouch-shaped case, in which the generating element is mounted in a sealed state.

The safety-related problem of the lithium secondary battery is even more serious for a middle or large-sized battery pack having a multi-cell structure. Since a plurality of battery cells is used in the multi-cell battery pack, abnormal operation of some of the battery cells may cause abnormal operation of the other battery cells with the result that a fire or explosion may occur, which may lead to a large-scale accident. For this reason, the middle or large-sized battery pack is provided with a safety system, such as a battery management system (BMS), to protect the battery cells from overcharge, overdischarge, and overcurrent.

Meanwhile, as the lithium secondary battery is continuously used, i.e. as the lithium secondary battery is repeatedly charged and discharged, the generating element and electrical connection members are gradually degraded. For example, degradation of the generating element leads to decomposition of electrode materials and the electrolyte, by which gas is generated. As a result, the battery cell (the container or the pouch-shaped case) gradually swells. In a normal state of the lithium secondary battery, an active controller, such as the BMS, detects overdischarge, overcharge, or overcurrent of the battery pack. In a case in which the detected overdischarge, overcharge, or overcurrent of the battery pack is excessive, the active controller interrupts electrical connection in the battery pack to lower the risk of the battery pack.

Figure 1:
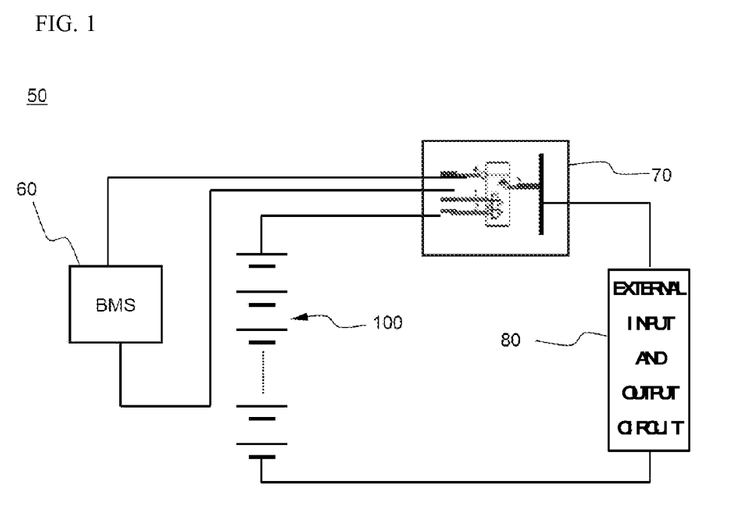
FIG. 1 is a typical view showing circuitry of a conventional battery pack.

In connection with this case, FIG. 1 is a typical view showing circuitry of a conventional battery pack. Referring to FIG. 1, a conventional battery pack 50 includes a battery module 100 constituted by a plurality of battery cells, a BMS 60 to detect information regarding an operation state of the battery module 100 and to control the battery module 100 based on the detected information, and a power connection and disconnection part (relay) 70 to perform connection and disconnection between the battery module 100 and an external input and output circuit (inverter) 80.

In a case in which the battery module 100 normally operates, the BMS 60 keeps the power connection and disconnection part 70 in an ON state. In a case in which abnormality of the battery module is sensed, the BMS 60 switches the state of the power connection and disconnection part 70 to an OFF state to interrupt charge and discharge of the battery module 100. On the other hand, in a case in which the BMS 60 abnormally operates or does not operate, the BMS 60 does not perform any control. Consequently, the power connection and disconnection part 70 is kept in the ON state. As a result, charge and discharge of the battery module 100 are continuously performed even in an abnormal state.

In a case in which the active controller is used as described above, however, it is necessary to supply external electric current to the BMS. If no electric current is supplied to the BMS, therefore, the BMS may not protect the battery pack. That is, the active controller checks a charge state of the battery and controls the battery using an electric signal. However, it is necessary to supply power to the active controller. Consequently, the active controller cannot be a fundamental solution when power is not normally supplied to the active controller.

In addition, gas may leak from the lithium secondary battery or a fire or explosion of the lithium secondary battery may occur when the lithium secondary battery is overcharged. As the lithium secondary battery is used as a high-voltage, high-capacity battery pack for vehicles, safety of the lithium secondary battery is important in preventing injury of people and damage to vehicles.

For this reason, it is necessary to provide a protection device for the battery pack to prevent leakage of gas from the overcharged lithium secondary battery or occurrence of a fire or explosion of the lithium secondary battery.

As an example of the protection device, an electrode terminal connection portion between the battery cells may be broken by swelling force of the battery cells to break an electric connection circuit of the battery pack.

In the above protection device, however, it is necessary to lower strength of the electrode terminals or to reduce the thickness of the electrode terminals such that the electrode terminal connection portion between the battery cells can be easily broken. The electrode terminals manufactured as described above have low resistance to external force, such as vibration or impact.

In addition, large force equivalent to tensile strength of the electrode terminals is needed for the protection device to break the electrode terminal connection portion. To this end, it is necessary for the battery cells to be considerably overcharged such that the battery cells excessively swell. As a result, gas may easily leak from the battery or a fire or explosion of the battery may easily occur.

Therefore, there is a high necessity for technology that is capable of fundamentally securing safety of the battery pack while solving the above problems.

DISCLOSURE

Technical Problem

The present invention has been made to solve the above problems and other technical problems that have yet to be resolved.

It is an object of the present invention to provide a battery pack including a circuit breaker and a fuse such that, when a battery cell swells due to abnormal operation, such as overcharge, overdischarge, and overcurrent, of a battery module or deterioration of the battery module as the result of charge and discharge of the battery cell, the circuit breaker senses expansion in volume of the outside of the battery cell to break the fuse, thereby securing a desired level of safety.

It is another object of the present invention to provide a battery pack that is capable of mechanically operating through addition of a few simple components, whereby the battery pack is easily manufactured and variously manufactured based thereupon.

Technical Solution

In accordance with one aspect of the present invention, the above and other objects can be accomplished by the provision of a battery pack configured such that battery modules, each of which includes a plurality of battery cells or unit modules connected to each other in series, are connected to each other in series in a state in which the battery modules are in tight contact with each other or stacked adjacent to each other, the battery pack including a fuse connected in series in an electrical connection circuit between the battery modules and a circuit breaker mounted at an outside of at least one of the battery modules to perform electric conduction when the battery cells swell, the circuit breaker being electrically connected to the electrical connection circuit to break the fuse when electric conduction is performed due to swelling of the battery cells.

In a battery pack including a power supply unit, to which plurality of battery cells or battery modules is connected, as previously described, a battery management system (BMS) detects an operation state of the power supply unit and controls charge and discharge of the power supply unit based on the detected operation state of the power supply unit, thereby securing safety of the battery pack. In a case in which the BMS does not operate due to interruption in supply of electric current, however, it is not possible to control charge and discharge of the power supply unit.

On the other hand, the battery pack according to the present invention includes a circuit breaker and a fuse configured to operate independently of the BMS. When the power supply unit malfunctions, therefore, the circuit breaker senses only expansion in volume of the battery cells or the battery modules and breaks the fuse based thereupon. As a result, electrical connection in the battery pack is interrupted and, therefore, overcurrent or overvoltage of the battery modules is prevented from being transmitted to an external input and output terminal, thereby securing safety of the battery pack.

In addition, the circuit breaker according to the present invention does not need additional power. As a result, there is no malfunction of the circuit breaker according to an electric signal and the circuit breaker normally operates without the supply of power. Consequently, reliability of the circuit breaker is very high.

In an example, electrode terminal portions of the battery pack may be fixed such that a stacked state of the battery modules is maintained even when volume of the battery cells is changed and the circuit breaker may be located at a portion corresponding to a side of one of the battery modules on which expansion stress due to swelling of the battery cells concentrates.

Consequently, the circuit breaker may sense swelling of the battery cells at a portion corresponding to the side of the battery module to electrically conduct the electrical connection circuit between the battery modules, thereby easily breaking the fuse.

In addition, the circuit breaker may sense swelling of overcharged battery cells and interrupt the electrical connection circuit between the battery modules before gas leaks from the battery cells or a fire or explosion of the battery cells occurs, thereby securing safety of the battery pack.

In another example, location of the circuit breaker is not particularly restricted so long as the circuit breaker is located at a portion at which the circuit breaker can easily sense swelling of the battery cells. Preferably, the circuit breaker is located at a portion corresponding to a side of an outermost battery module.

Consequently, the circuit breaker is provided at the side of the outermost battery module on which expansion stress due to swelling of the battery cells concentrates, thereby easily sensing abnormality of the battery modules.

In a preferred example, the circuit breaker may include a first conductive member contacting a side of one of the battery modules, a second non-conductive member coupled to the first member via an elastic guide in a state in which the second member is fixed in position to the battery module, and a conduction member including a cathode conduction part and an anode conduction part mounted to the second member such that the cathode conduction part and the anode conduction part come into contact with the first member according to the increase in volume of the battery modules at the time of swelling of the battery cells, the cathode conduction part and the anode conduction part being electrically connected to the electrical connection circuit between the battery modules.

Based on the structure of the physical or mechanical circuit breaker as described above, it is possible to secure safety of the battery pack even when the BMS malfunctions. In addition, the battery pack according to the present invention mechanically operates through addition of a few simple components as described above, whereby the battery pack is easily manufactured and application of various structures is possible based thereupon.

As an example of the above structure, a cathode terminal of one outermost battery module and an anode terminal of the other outermost battery module may be electrically connected to the cathode conduction part and the anode conduction part of the circuit breaker via wires, respectively.

In another example, the first member and the conduction member may be electrically spaced apart from each other in a state in which the battery modules normally operate. When the battery cells swell in a state in which the battery modules abnormally operate, the first member may be pushed outward by the battery module, the volume of which expands, with the result that opposite ends of the first member may come into contact with the cathode conduction part and the anode conduction part, whereby high current flows between the cathode conduction part and the anode conduction part and thus the fuse is broken.

In a concrete example, the first member may include a first contact part, formed in a bracket shape when viewed in horizontal section, contacting a central portion of the outside of the battery module and second contact parts extending from opposite sides of the first contact part to portions corresponding to the cathode conduction part and the anode conduction part of the conduction member.

The elastic guide is not particularly restricted so long as the first member and the second member can repeatedly come into contact with each other and be separated from each other. For example, the elastic guide may include a combination of a bolt and a nut coupled to the first member and the second member in a state in which a compression spring is interposed between the first member and the second member.

Specifically, when the battery cells swell due to overcharge of the battery cells, the side of a corresponding one of the battery cells pushes the first member. As a result, the first member comes into contact with the second member. Consequently, electric conduction between the first member and the conduction member is achieved.

Meanwhile, each of the unit modules may include two or more battery cells configured to have a stacked structure in which electrode terminals are connected to each other in series and an electrode terminal connection portion of the electrode terminals is bent and a pair of sheathing members coupled to fully cover an outside of a battery cell stack excluding the electrode terminals.

Preferably, each of the sheathing members may have an inner structure corresponding to an external shape of the battery cell stack and the sheathing members may be coupled to each other by assembly and fastening.

Specifically, sectional coupling portions of the sheathing members may be formed to have symmetrically bent structures when viewed in vertical section such that, when the sheathing members are pushed to each other in a state in which the sheathing members are in contact with each other so as to face each other, the sheathing members are engaged with each other by elastic coupling.

In another example, the sectional coupling portions of the sheathing members may be coupled to each other by fastening protrusions and fastening grooves such that, when the sheathing members are pushed to each other in a state in which the sheathing members are in contact with each other so as to face each other, the sheathing members are engaged with each other by elastic coupling Preferably, the electrode terminals are coupled to each other by welding. However, embodiments of the present invention are not limited thereto.

Each of the battery cells is a plate-shaped secondary battery having a small thickness and a relatively large width and length so as to minimize the overall size of the battery module when the battery cells are stacked to constitute the battery module. A preferred example of the secondary battery may be a secondary battery configured to have a structure in which an electrode assembly of a cathode/separator/anode structure is mounted in a battery case formed of a laminate sheet including a resin layer and a metal layer and a cathode terminal and an anode terminal protrude from opposite ends of the battery case. Specifically, the electrode assembly may be mounted in a pouch-shaped battery case formed of an aluminum laminate sheet. The secondary battery having the above structure may be referred to as a 'pouch-shaped battery cell.' However, the above battery cell is given only by way of illustration. It is obvious that the present invention may be applied to all types of battery cells, expansion in volume of each of which is transmitted to the outside of a battery case of each of the battery cells.

Meanwhile, the secondary battery generates heat during charge and discharge of the secondary battery. It is important to effectively discharge the generated heat from the secondary battery in order to increase the lifespan of the secondary battery.

Consequently, the sheathing members may be high-strength cell covers exhibiting high thermal conductivity to more easily discharge the heat generated in the battery cells outward. Preferably, each of the cell covers is formed of a metal sheet.

The electrode terminals may be formed at an upper end or a lower end of each of the battery cells. Alternatively, the electrode terminals may be respectively formed at the upper and the lower end of each of the battery cells.

According to circumstances, when swelling of the battery cells causes the increase in volume of the battery cells equivalent to two to five times a thickness of each of the battery cell, the circuit breaker may sense the change in volume of the battery cells to break the circuit of the battery pack. Such a setting range may be changed according to safety test standards of a desired battery module.

The battery pack according to the present invention may be manufactured by combining battery modules based on desired output and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

Effects of the Invention

As is apparent from the above description, the battery pack according to the present invention includes a circuit breaker and a fuse such that, when the battery cell swells due to abnormal operation, such as overcharge, overdischarge, and overcurrent, of the battery module or deterioration of the battery module as the result of charge and discharge of the battery cell, the circuit breaker senses expansion in volume of the outside of the battery cell to break the fuse, thereby securing a desired level of safety.

In addition, the battery pack according to the present invention does not need power. As a result, there is no malfunction of the battery pack according to an electric signal and, even when power is not supplied to the BMS and, therefore, the BMS does not operate, it is possible to secure safety of the battery pack and to greatly improve reliability of the battery pack.

Furthermore, the battery pack mechanically operates through addition of a few simple components, whereby the battery pack is easily manufactured and variously manufactured based thereupon.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
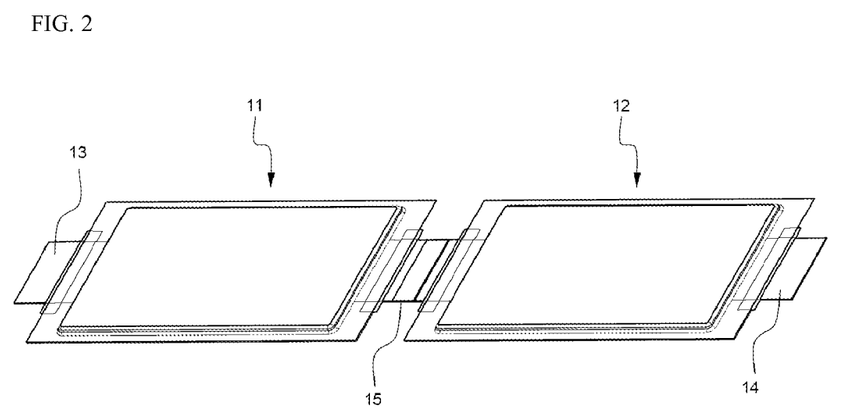
FIGS. 2 and 3 are perspective views showing a process of bending a pair of battery cells constituting a unit module according to an embodiment of the present invention.
Figure 3:
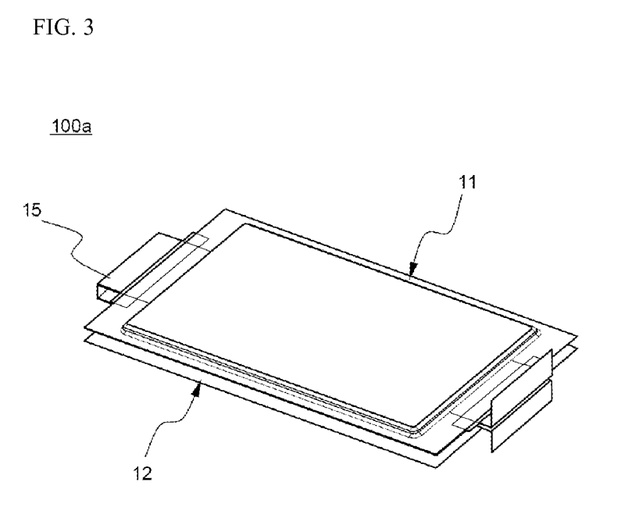
Figure 4:
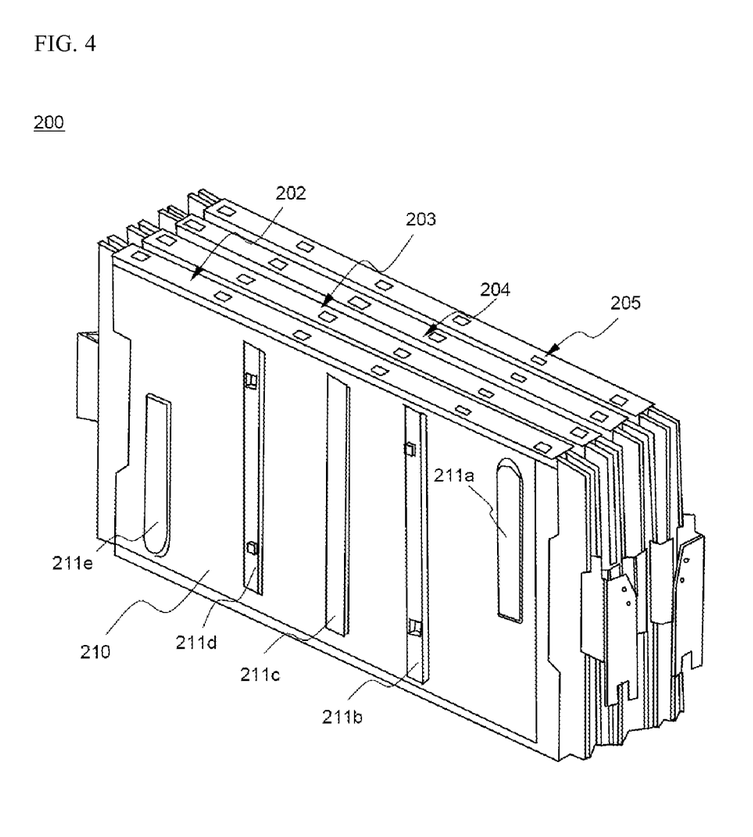
FIG. 4 is a perspective view showing a unit module stack according to the present invention.

FIGS. 2 and 3 are perspective views typically showing a process of bending a pair of battery cells constituting a unit module according to the present invention and FIG. 4 is a perspective view typically showing a unit module stack according to the present invention.

Referring to these drawings, in a state in which two pouch-shaped battery cells 11 and 12 is arranged in series in the longitudinal direction such that electrode terminals 13 and 14 of the pouch-shaped battery cells 11 and 12 are successively adjacent to each other, the electrode terminals 13 and 14 of the pouch-shaped battery cells 11 and 12 are welded to each other and then the pouch-shaped battery cells 11 and 12 are folded such that the pouch-shaped battery cells 11 and 12 overlap each other. According to circumstances, the electrode terminals 13 and 14 of the pouch-shaped battery cells 11 and 12 may be coupled to each other by welding in a state in which the electrode terminals are folded such that the electrode terminals overlap each other.

In addition, as shown in FIG. 3, an electrode terminal connection portion 15, at which the electrode terminals are coupled by welding, of a battery cell stack 100a constituted by the folded pouch-shaped battery cells is bent in a bracket shape.

A unit module stack 200 is configured to have a structure in which four unit modules 202, 203, 204, and 205, each of which is manufactured to have a structure in which battery cells are covered by sheathing members 210, are stacked in zigzags in a state in which the unit modules 202, 203, 204, and 205 are connected to one another in series.

In addition, the unit module 202 includes two battery cells 11 and 12 configured to have a stacked structure in which electrode terminals 13 and 14 are connected to each other in series and an electrode terminal connection portion 15 of the electrode terminals 13 and 14 is bent and a pair of sheathing members 210 coupled to fully cover the outside of the battery cell stack 100a excluding the electrode terminals 13 and 14.

Linear protrusions 211a, 211b, 211c, 211d, and 211e are formed at the outside of each of the sheathing members 210 in a state in which the linear protrusions 211a, 211b, 211c, 211d, and 211e are spaced apart from one another in the lateral direction. The linear protrusions 211a and 211e, which have a small length in the lateral direction, are disposed diagonally to each other.

Each of the sheathing members 210 has an inner structure corresponding to an external shape of the battery cell stack 100a. The sheathing members 210 are coupled to each other by assembly and fastening.

Specifically, sectional coupling portions of the sheathing members 210 are coupled to each other by fastening protrusions and fastening grooves such that, when the sheathing members 210 are pushed to each other in a state in which the sheathing members 210 are in contact with each other so as to face each other, the sheathing members 210 are engaged with each other by elastic coupling.

Figure 5:
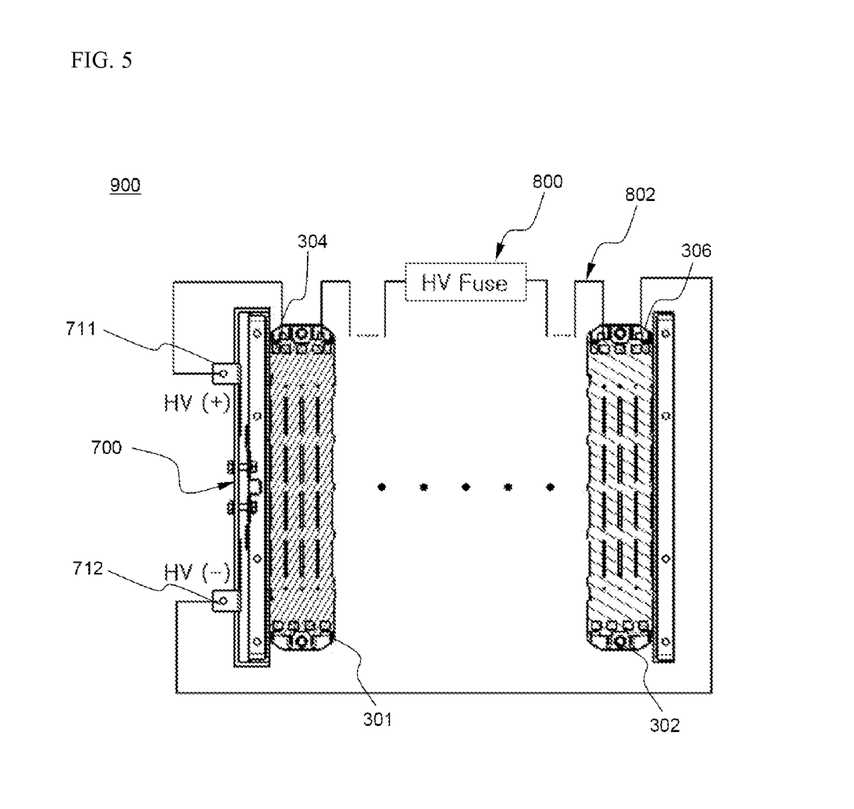
FIG. 5 is a view showing circuitry of a battery pack according to an embodiment of the present invention.

FIG. 5 is a view typically showing circuitry of a battery pack according to an embodiment of the present invention.

Referring to this drawing, a battery pack 900 includes a fuse 800 connected in series to an electrical connection circuit 802 between battery modules 301 and 302 and a circuit breaker 700 mounted at the outside of the outermost battery module 301 to perform electric conduction when battery cells swell. The circuit breaker 700 is electrically connected to the electrical connection circuit 802 to break the fuse 800 when electric conduction is performed due to swelling of the battery cells.

A cathode terminal 304 of one outermost battery module 301 and an anode terminal 306 of the other outermost battery module 302 are electrically connected to a cathode conduction part 711 and an anode conduction part 712 of the circuit breaker 700 via wires, respectively.

In addition, in the battery pack 900, electrode terminal portions are fixed such that a stacked state of the battery modules 301 and 302 is maintained even when volume of the battery cells is changed and the circuit breaker 700 is located at a portion corresponding to the side of the outermost battery module 301 on which expansion stress due to swelling of the battery cells concentrates. Consequently, it is possible to fundamentally prevent malfunction of the battery pack according to an electric signal to supply power.

Specifically, in a state in which the battery modules 301 and 302 are normal, the circuit breaker 700 is cut off. As a result, current generated by the battery modules 301 and 302 does not flow to the cathode conduction part 711 and the anode conduction part 712. Consequently, the fuse 80 is not broken unless overcurrent flows in the electrical connection circuit 802 due to any other causes. Current from the battery pack 900 normally flows to an external device (not shown) via an external input and output terminal (not shown).

In a case in which the battery modules 301 and 302 are abnormal, for example, in a case in which overcurrent flows in the battery modules 301 and 302, the battery cells swell with the result that expansion force of the battery cells is transmitted to the outermost battery module 301.

The expansion force is transmitted to the circuit breaker 700 located at the side of the outermost battery module 301 to perform electric conduction between the cathode conduction part 711 and the anode conduction part 712 of the circuit breaker 700.

High current flows in the electrical connection circuit 802 of the battery pack 900 due to such electric conduction. As a result, the fuse 800 is broken and, therefore no current flows in the electrical connection circuit 802 of the battery pack 900.

Figure 6:
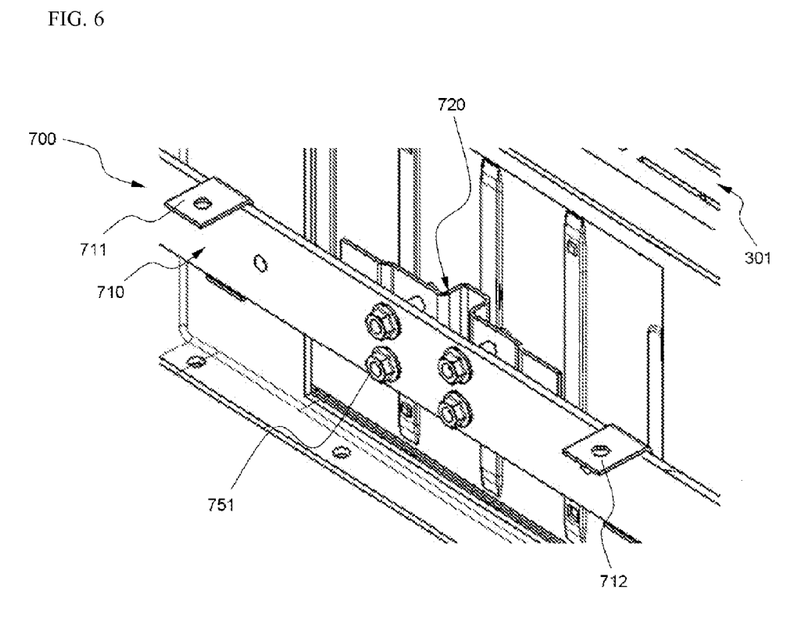
FIG. 6 is a partial perspective view showing one side of the battery pack of FIG. 5.
Figure 7:
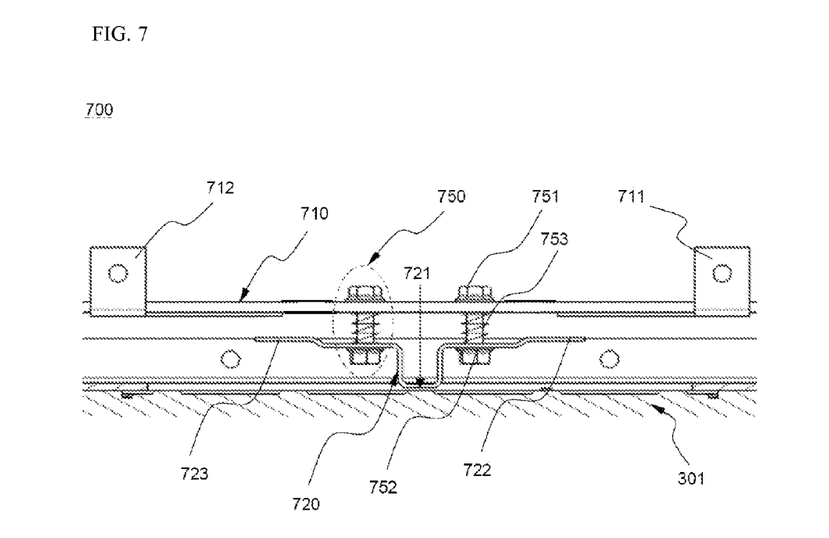
FIG. 7 is a plan view showing a state before operation of a circuit breaker of FIG. 5.

FIG. 6 is a partial perspective view typically showing one side of the battery pack of FIG. 5 and FIG. 7 is a plan view typically showing a state before operation of the circuit breaker of FIG. 5.

Figure 8:
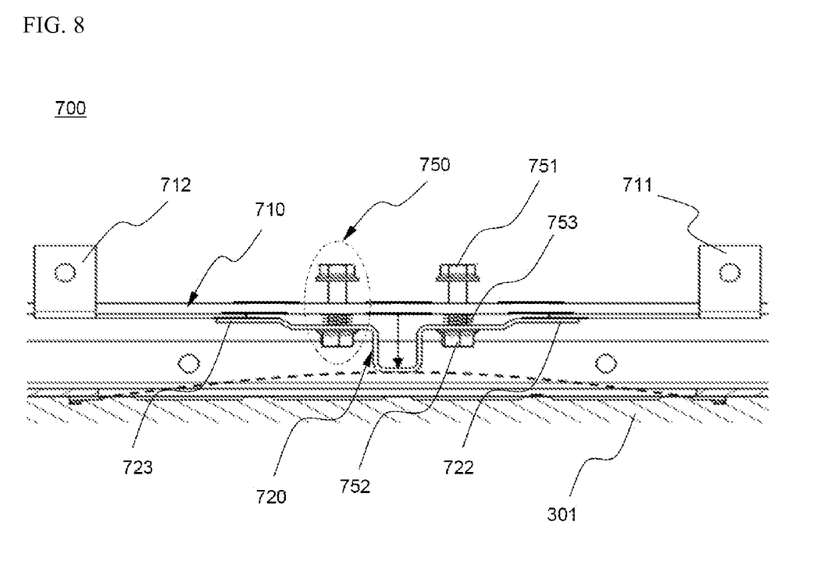
FIG. 8 is a plan view showing a state after operation of the circuit breaker of FIG. 5.

In addition, FIG. 8 is a plan view showing a state after operation of the circuit breaker of FIG. 5.

Referring to these drawings together with FIG. 5, the circuit breaker 700 includes a first conductive member 720 contacting one side of the outermost battery module 301, a second non-conductive member 710, and a conduction member including a cathode conduction part 711 and an anode conduction part 712 electrically connected to the electrical connection circuit 802 between the battery modules 301 and 302.

The second member 710 is coupled to the first member 720 via an elastic guide 750 in a state in which the second member 710 is fixed in position to the outermost battery module 301.

The conduction member is mounted to the second member 710. When the volume of the outermost battery module 301 is increased due to swelling of the battery cells, the conduction member comes into contact with the first member 720.

The first member 720 includes a first contact part 721, formed in a bracket shape ('⊏'-typed shape) when viewed in horizontal section, contacting a central portion of the outside of the outermost battery module 301 and second contact parts 722 and 723 extending from opposite sides of the first contact part 721 to portions corresponding to the cathode conduction part 711 and the anode conduction part 712 of the conduction member.

In addition, the elastic guide 750 includes a combination of a bolt 751 and a nut 752 variably coupled to the first member 720 and the second member 710 in a state in which a compression spring 753 is interposed between the first member 720 and the second member 710.

Hereinafter, operation of the circuit breaker 700 in a state in which the battery modules 301 and 302 normally or abnormally operate will be described.

First, in a state in which the battery modules 301 and 302 normally operate, as shown in FIG. 7, the first member 720 and the second member 710 are electrically or mechanically spaced apart from each other.

On the other hand, when the battery cells swell in a state in which the battery modules 301 and 302 abnormally operate, as shown in FIG. 8, the first member 720 is pushed outward by the battery module 301, the volume of which expands. As a result, opposite ends of the first member 720 come into contact with the cathode conduction part 711 and the anode conduction part 712. Consequently, high current flows between the cathode conduction part 711 and the anode conduction part 712, whereby the fuse 800 is broken.

Specifically, the cathode terminal 304 of one outermost battery module 301 and the anode terminal 306 of the other outermost battery module 302 are electrically connected to the cathode conduction part 711 and the anode conduction part 712 of the circuit breaker 700 via the wires, respectively.

In addition, in a state in which the battery modules 301 and 302 normally operate, the first member 720 is electrically spaced apart from the cathode conduction part 711 and the anode conduction part 712 of the conduction member.

However, when the battery cells swell in a state in which the battery modules 301 and 302 abnormally operate (see a dotted line of FIG. 8), the first member 720 is pushed outward by the outermost battery module 301, the volume of which expands, and the second contact parts 722 and 723 of the first member 720 come into contact with the cathode conduction part 711 and the anode conduction part 712 of the conduction member via the elastic guide 750. As a result, current flows between the cathode conduction part 711 and the anode conduction part 712.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack configured such that battery modules, each of which comprises a plurality of battery cells or unit modules connected to each other in series, are connected to each other in series in a state in which the battery modules are in tight contact with each other or stacked adjacent to each other, the battery pack comprising:
   a fuse connected in series in an electrical connection circuit between the battery modules;
   a circuit breaker mounted at an outside of at least one of the battery modules to perform electric conduction when the battery cells swell, the circuit breaker being electrically connected to the electrical connection circuit to break the fuse when electric conduction is performed due to swelling of the battery cells, and
   wherein the circuit breaker comprises:
   a first conductive member contacting a side of one of the battery modules;

a second non-conductive member coupled to the first conductive member via an elastic guide in a state in which the second member is fixed in position to the battery module; and a conduction member comprising a cathode conduction part and an anode conduction part mounted to the second non-conductive member such that the cathode conduction part and the anode conduction part come into contact with the first conductive member according to the increase in volume of the battery modules at the time of swelling of the battery cells, the cathode conduction part and the anode conduction part being electrically connected to the electrical connection circuit between the battery modules.

2. The battery pack according to claim 1, wherein electrode terminal portions of the battery pack are fixed such that a stacked state of the battery modules is maintained even when volume of the battery cells is changed, and the circuit breaker is located at a portion corresponding to a side of one of the battery modules on which expansion stress due to swelling of the battery cells concentrates.

3. The battery pack according to claim 1, wherein the circuit breaker is located at a portion corresponding to a side of an outermost battery module.

4. The battery pack according to claim 1, wherein a cathode terminal of one outermost battery module and an anode terminal of the other outermost battery module are electrically connected to the cathode conduction part and the anode conduction part of the circuit breaker via wires, respectively.

5. The battery pack according to claim 1, wherein the first conductive member and the conduction member are electrically spaced apart from each other in a state in which the battery modules normally operate.

6. The battery pack according to claim 1, wherein, when the battery cells swell in a state in which the battery modules abnormally operate, the first conductive member is pushed outward by the battery module, the volume of which expands, with the result that opposite ends of the first conductive member come into contact with the cathode conduction part and the anode conduction part, whereby high current flows between the cathode conduction part and the anode conduction part and thus the fuse is broken.

7. The battery pack according to claim 1, wherein the first conductive member comprises:

a first contact part, formed in a bracket shape when viewed in horizontal section, contacting a central portion of the outside of the battery module; and second contact parts extending from opposite sides of the first contact part to portions corresponding to the cathode conduction part and the anode conduction part of the conduction member.

8. The battery pack according to claim 1, wherein the elastic guide comprises a combination of a bolt and a nut coupled to the first conductive member and the second non-conductive member in a state in which a compression spring is interposed between the first conductive member and the second non-conductive member.

9. The battery pack according to claim 1, wherein each of the unit modules comprises:

two or more battery cells configured to have a stacked structure in which electrode terminals are connected to each other in series and an electrode terminal connection portion of the electrode terminals is bent; and a pair of sheathing members coupled to fully cover an outside of a battery cell stack excluding the electrode terminals.

10. The battery pack according to claim 9, wherein each of the sheathing members has an inner structure corresponding to an external shape of the battery cell stack, and the sheathing members are coupled to each other by assembly and fastening.

11. The battery pack according to claim 9, wherein the electrode terminals are coupled to each other by welding.

12. The battery pack according to claim 1, wherein each of the battery cells is a plate-shaped battery cell configured to have a structure in which an edge of a battery case formed of a laminate sheet comprising a resin layer and a metal layer is sealed in a state in which an electrode assembly is mounted in the battery case.

13. The battery pack according to claim 12, wherein the battery case is a pouch-shaped case formed of an aluminum laminate sheet.

14. The battery pack according to claim 9, wherein the sheathing members are high-strength cell covers.

15. The battery pack according to claim 9, wherein the electrode terminals are formed at an upper end or a lower end of each of the battery cells or respectively formed at the upper and the lower end of each of the battery cells.

16. The battery pack according to claim 1, wherein, when swelling of the battery cells causes the increase in volume of the battery cells equivalent to two to five times a thickness of each of the battery cell, the circuit breaker senses the change in volume of the battery cells to break the circuit of the battery pack.

17. The battery pack according to claim 1, wherein the battery pack is used as a power source for an electric vehicle, a hybrid electric vehicle, a plug-in hybrid electric vehicle, or a power storage device.

* * * * *